United States Patent
Keely

[11] Patent Number: 5,941,487
[45] Date of Patent: Aug. 24, 1999

[54] RETAINER FOR HOLDING EYEGLASSES

[76] Inventor: Mina V. Keely, 1784 Seneca Blvd., Winter Springs, Fla. 32708

[21] Appl. No.: 08/852,433

[22] Filed: May 7, 1997

[51] Int. Cl.[6] .................................................. A47B 96/06
[52] U.S. Cl. ...................................... 248/231.51; 248/902
[58] Field of Search ........................... 248/231.51, 228.4, 248/314, 902, 291.1, 289.11, 315

[56] References Cited

U.S. PATENT DOCUMENTS

| | | | |
|---|---|---|---|
| 2,091,420 | 8/1937 | Segal | 24/250 |
| 2,307,808 | 1/1943 | Segal | 24/238 |
| 2,510,181 | 6/1950 | Jury | 248/226.11 |
| 2,634,470 | 4/1953 | DeGraff, Jr. | 24/3 |
| 2,850,152 | 9/1958 | Marrufo | 206/37 |
| 3,552,701 | 1/1971 | Montagano | 248/309 |
| 4,452,354 | 6/1984 | Tabachnick | 206/5 |
| 4,458,384 | 7/1984 | Arnold . | |
| 4,662,039 | 5/1987 | Richardson | 24/489 |
| 4,867,402 | 9/1989 | Benson et al. . | |
| 4,894,887 | 1/1990 | Ward, II . | |
| 4,898,311 | 2/1990 | Boyer | 224/257 |
| 5,000,410 | 3/1991 | Beavers | 248/205.3 |
| 5,046,696 | 9/1991 | Lee . | |
| 5,069,416 | 12/1991 | Ennis | 248/902 |
| 5,079,808 | 1/1992 | Brown | 24/67.7 |
| 5,318,292 | 6/1994 | DeMarco . | |
| 5,407,642 | 4/1995 | Lord | 422/122 |
| 5,460,346 | 10/1995 | Hirsch | 248/229.13 |

*Primary Examiner*—Ramon O. Ramirez
*Assistant Examiner*—Anita M. King
*Attorney, Agent, or Firm*—Robert L. Wolter, Esq.; Holland & Knight LLP

[57] ABSTRACT

A retainer for holding eyeglasses that includes a retainer ring rotatably mounted to the clamping means. The clamping means includes a first clamp member pivotally attached to a second clamp member, and a means for biasing together a first end of each of the clamp members. A mounting element is attached to the retainer ring in a spaced relation to the clamping means. The retainer ring is rotatable about a longitudinal axis of the mounting element.

4 Claims, 1 Drawing Sheet

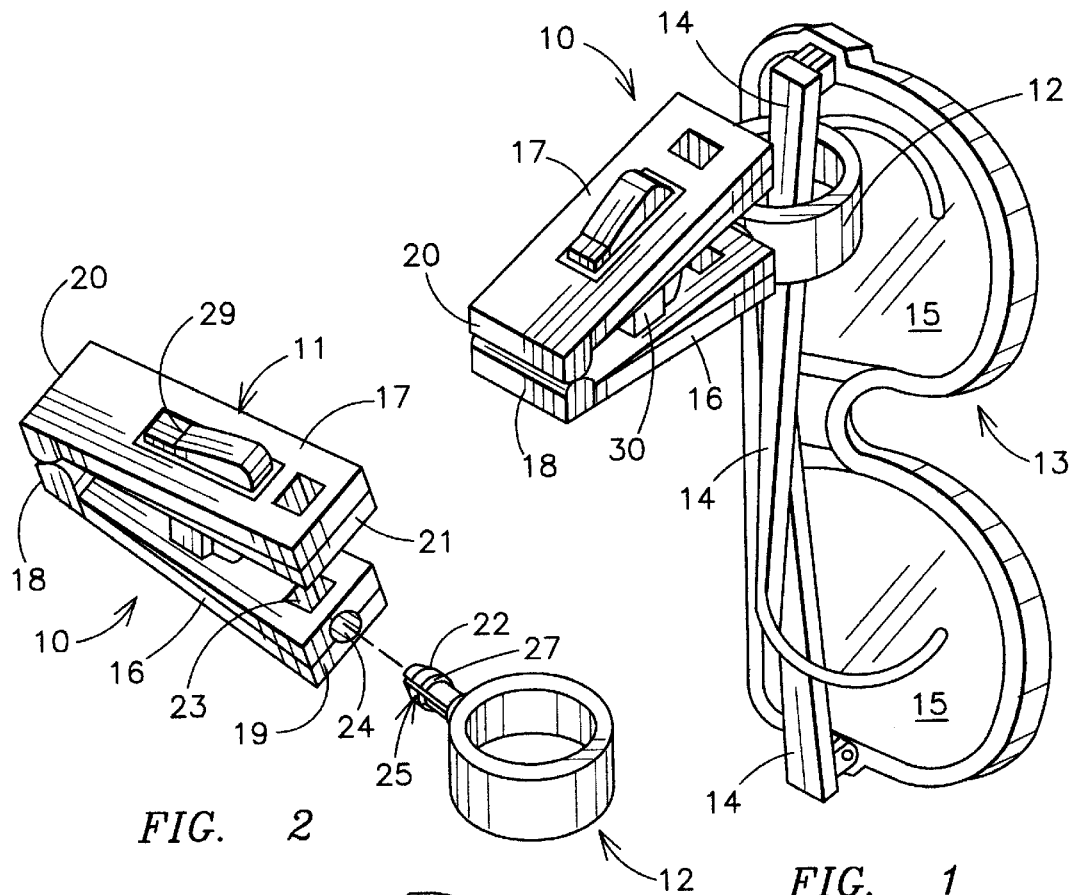
FIG. 1
FIG. 2
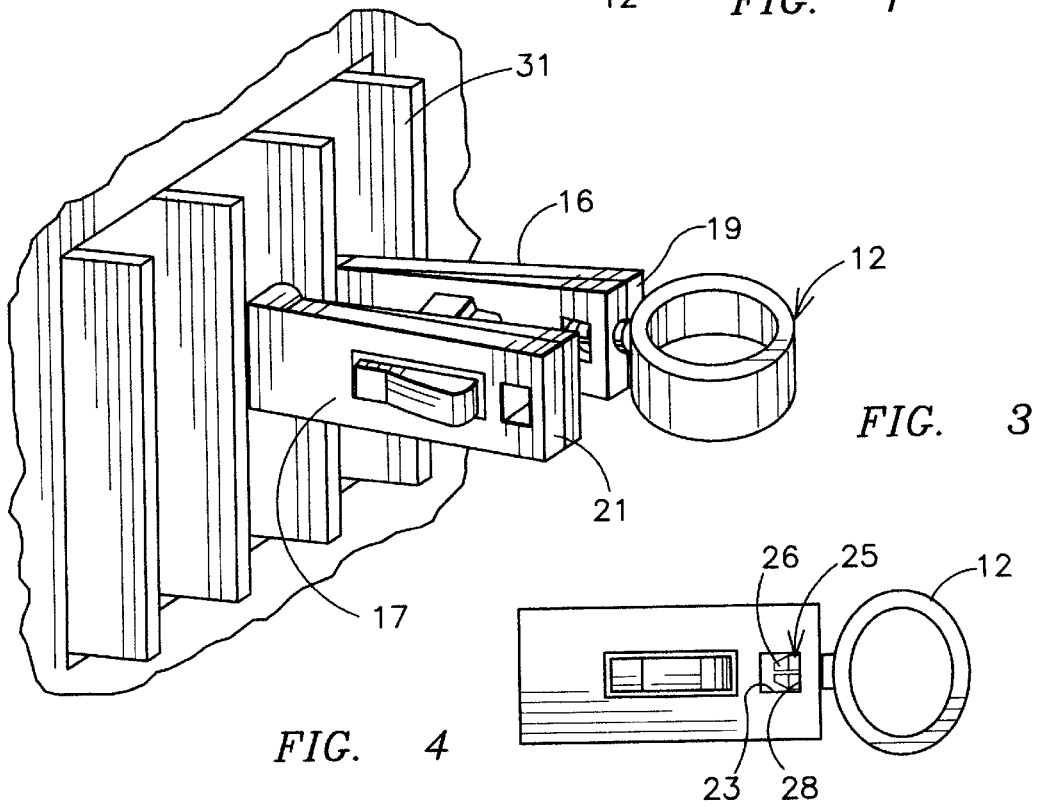
FIG. 3
FIG. 4

RETAINER FOR HOLDING EYEGLASSES

This invention relates to the field of inventions for devices used for holding eyeglasses. More specifically, this invention relates to eyeglasses-retaining devices that are secured against fixed objects and have a retainer portion for holding a pair of eyeglasses.

BACKGROUND OF THE INVENTION

Eyeglasses, and in particular sunglasses, are often removed by a wearer then set aside for future use. For example, a user may wear eyeglasses or sunglasses while driving an automobile. When a user removes the pair of glasses, a user may place the eyeglasses aside in the automobile for later use, either while driving an automobile or before or after driving the automobile. Alternatively, the user may wish to remove the pair of glasses while driving. It is desirable to have an eyeglasses retainer within reach of the driver to place, or remove a pair of glasses.

There are several patents that disclose devices for holding eyeglasses on clothing. Such devices are disclosed in U.S. Pat. No. 4,894,887 (the '887 patent); U.S. Pat. No. 4,458,384 (the '384 patent) and U.S. Pat. No. 2,850,152 (the '152 patent). Generally, each of these patents illustrates a retainer device having a means for securing the device to an article of clothing. A retainer is attached to the securing means, for holding the pair of eyeglasses.

The '152 patent is for a "Combined Fountain Pen, Spectacles and Comb Case". This device includes a pocket 24 for holding the eyeglasses and a pocket clip 14 for securing the pocket 24 to clothing. The Arnold patent (the '384 patent) teaches a retainer having two aligned horizontally disposed loops in which the temple piece of the eyeglasses are inserted. The retainer loops are secured to articles of clothing by a pin or clip. The '887 patent is for an "Eyeglass Retainer" having a hanger portion 26 that is integrally attached to a clip having two fingers 16 and 17. The clip is attached to a shirt pocket.

Each of these devices is used with articles of clothing and do not appear to be adaptable for use with fixed objects, such as securing the device to a surface in the interior of an automobile. In an automobile, for instance, there may be several surfaces upon which a retainer device is placed. Many of these surfaces may be disposed at various angles. Inasmuch as the aforementioned devices are used for clothing, the clips or pins are not capable of securing or retaining to vertically disposed edges or surfaces.

There are patents that disclose eyeglasses or sunglasses holders for use in automobiles. U.S. Pat. No. 3,552,701 discloses an "Interior Auto Mirror Support for Sunglasses or the Like". This device is secured to a rear view mirror post or frame above the mirror. The support includes two spaced apart openings for receiving the temple pieces of the eyeglasses. U.S. Pat. No. 4,867,402, issued to Benson discloses a receptacle for eyeglasses that is attachable to an automobile windshield.

Another patent of interest is U.S. Pat. No. 5,046,696 for an "Eyeglass Holder". This device includes a planar member having an adhesive back surface. A protruded member, integrally attached to the planar member, forms an opening for receiving the temple portion of the eyeglasses.

SUMMARY OF THE INVENTION

It is an object of the present invention to provide a retainer device for holding eyeglasses. Another object of this invention is to provide a retainer device that is mountable on fixed objects that may have edges or surfaces, disposed at different angles. Still another objective is to provide the device with a retainer ring that is rotatable to a position for holding glasses. Still another object is to provide such a device that may be mounted in an automobile that is within reach of the driver and does not obstruct the view of the driver.

In order that the above-referenced objectives may be accomplished, the invention for a retainer for holding eyeglasses includes a clamping means and a retainer ring rotatably mounted to the clamping means. A mounting element secures the retainer ring to the clamping means in spaced relation to the clamping means, and the ring is rotatable about a longitudinal axis of the mounting element. The clamping means is mountable on a fixed object, the retainer ring is rotated to a holding position and a temple piece from a pair of eyeglasses is inserted through ring.

The foregoing and other objects, features and advantages of the invention will be apparent from the following more particular description of the preferred embodiments of the invention, as illustrated in the accompanying drawings.

BRIEF DESCRIPTION OF THE DRAWINGS

FIG. 1 is a perspective view of the invention holding a pair of eyeglasses or sunglasses.

FIG. 2 is an expanded perspective view of the invention.

FIG. 3 is a perspective view of the invention in a vertical position within the retainer ring horizontally disposed attached to a vertical air vent in a vertical position.

FIG. 4 is a top view of the eyeglasses retainer.

DETAILED DESCRIPTION OF THE DRAWINGS

The invention, and its individual parts, are illustrated in FIGS. 1 and 2. The retainer 10 includes a clamping means 11 and a retainer ring 12 secured in spaced relation to the clamping means 11. The retainer ring 12 is mounted to the clamping means 11 so that it is rotatable to preferably a substantially horizontal position for holding the eyeglasses 13.

As shown in FIG. 1, a pair of eyeglasses 13 includes two temple pieces 14 attached to lenses 15. The temple pieces 14 are folded in a storage position, and one of the temple pieces 14 is inserted through the retainer ring 12.

The clamping means 11 includes a first clamp member 16 and a second clamp member 17. The first clamp member 16 has a first end 18 and a second end 19, and the second clamp member 17 also has a first end 20 and a second end 21.

A clip 29 is mounted to the clamp members 16 and 17 as shown in FIGS. 1 & 2. The clip 29 biases together the first end 18 of clamp member 16 and the first end 20 of the second clamp member 17, and separates the second end 19 and 21 of each respective clamp member 16 and 17. The clamp members 16 and 17 pivot on posts 30, intermediate and integral the clamp members 16 and 17, when the second ends 19 and 21 of the clamp members 16 and 17 are forced together.

A mounting element 22 is secured to the second end 19 of the first clamp member 16. The retainer ring 12 and mounting element 22 are preferably formed as an integral unit. In the embodiment shown in FIGS. 1–5, the first clamp member 16 has an opening 23 toward its second end 19. An aperture 24 is formed in the second end 19 in communication with the opening 23. The mounting element 22 is inserted in the aperture 24 and extends into the opening 23.

The mounting element includes a head 25 separated into two lobes 26. The mounting element 22 is composed of a resilient material as plastic so the lobes 26 may be squeezed together to have a diameter less than that of the aperture 24. When the head 25 is inserted through the aperture 24 and into the opening 23 the lobes 26 separate. Each lobe 26 has a lip 27 that catches an interior surface 28 of the opening 23, securing the mounting element 22 to the clamping means 11.

The mounting element 22 is rotatable within the aperture 24 about the longitudinal axis of the mounting element 22 so the retainer ring 12 is rotatable to a position for holding the eyeglasses. Alternatively, the retainer ring 12 and mounting element 22 may be separate pieces so the retainer ring 12 is rotatable on the mounting element 22 about the longitudinal axis of the mounting element 22.

As shown in FIG. 3, the clamp means 11 is attached to an air vent 31 of a motor vehicle that is in a vertically disposed position. The retainer ring 12 is rotated to a horizontally disposed position. The temple piece 14 of a pair of eyeglasses 13 is inserted in the retainer ring 12. In FIG. 1, the clamp means 11 is horizontally disposed and the retainer ring 12 and is rotated to a horizontally disposed position. The retainer ring 12 is preferably rotatable 360°, so it may be horizontally positioned despite the angle of clamping means 11 attachment to a surface.

While I have disclosed the preferred embodiment of my invention, it is not intended that this description in any way limits the invention, nor is it limited to use with an automobile, but rather this invention should be limited only by a reasonable interpretation of the now recited claims.

Having thus described my invention, what I claim as new and desire to secure by Letter Patent is:

1. A retainer holding a pair of eyeglasses having a frame including a pair of temple pieces attached to lense frames, said retainer comprising:
   (a) a clamp, having a first clamp member and a second clamp member, whereby said first clamp member and said second clamp member are pivotally attached together;
   (b) means, attached to said first clamp member and said second clamp member, for biasing together a first end of said first clamp member and a first end of said second clamp member; and,
   (c) a retainer ring mounted to a second end of the first clamp member, and said retainer ring is rotatable to a position wherein said retainer ring extends in a plane traversing a plane in which a temple piece extends, and said temple piece is inserted through said retainer ring.

2. The retainer holding a pair of eyeglasses, as defined in claim 1, further including a mounting element attached to the second end of said first clamp member, and said retainer ring is attached to the mounting element in spaced relation to the first clamp member and said retainer ring rotatable about a longitudinal axis of the mounting element.

3. A method for holding eyeglasses, comprising the steps of:
   (a) providing a pair of eyeglasses having a pair of temple-pieces attached to lenses;
   (b) providing a clamping means having a first clamp member and a second clamp member;
   (c) biasing together a first end of the first clamp member and a first end of the second clamp member;
   (d) mounting a retainer ring to the first clamp member wherein said retainer ring is rotatable on with respect to the clamping means;
   (e) clamping the clamping means to a fixed object; and,
   (f) inserting one of said temple pieces on said eyeglasses, through said retainer ring.

4. A method, as defined in claim 3, wherein said step of inserting the temple pieces through the retainer ring includes rotating the retainer ring to a position for holding the eyeglasses.

* * * * *